United States Patent [19]
Lee et al.

[11] Patent Number: 6,013,593
[45] Date of Patent: Jan. 11, 2000

[54] WET RECYCLING PROCESS FOR IMPREGNATED ACTIVE CARBON BY EXTRACTION WITH ORGANIC SOLVENT

[75] Inventors: Hoo-Kun Lee; Myeong-Soo Jeong; Won-Zin Oh; Hyun-Soo Park, all of Daejeon-Si, Rep. of Korea

[73] Assignee: Korea Atomic Energy Research Institute, Daejeon-Si, Rep. of Korea

[21] Appl. No.: 09/044,161

[22] Filed: Mar. 19, 1998

[30] Foreign Application Priority Data

Nov. 4, 1997 [KR] Rep. of Korea ............... 97-57935

[51] Int. Cl.$^7$ ................................................. B01J 20/34
[52] U.S. Cl. ............................ 502/29; 502/22; 502/33
[58] Field of Search ............................ 502/22, 29, 33

[56] References Cited

U.S. PATENT DOCUMENTS

| | | | |
|---|---|---|---|
| 3,720,626 | 3/1973 | Benzaria et al. | 252/413 |
| 4,111,833 | 9/1978 | Evans | 252/429 |
| 5,719,093 | 2/1998 | Park et al. | 502/44 |

*Primary Examiner*—John F. Niebling
*Assistant Examiner*—Alexander G. Ghyka
*Attorney, Agent, or Firm*—Nikaido, Marmelstein, Murray & Oram LLP

[57] ABSTRACT

A wet recycling method for impregnated active carbon used to remove radioactive organic iodide in a nuclear power plant by extracting impregnated substance and radioactive organic iodide from the used impregnated active carbon with an acetonitrile solution and reproducing active carbon to be used in preparing impregnated active carbon, the filtered extractive solution being distilled to obtain pure acetonitrile for the use purpose as an extractive solution, the impregnated substance and radioactive organic iodide extracted in a small amount of solid, thus reducing the volume of the waste impregnated active carbon greatly to decrease solid waste material and at the same time recycle materials.

12 Claims, 1 Drawing Sheet

WET RECYCLING PROCESS FOR IMPREGNATED ACTIVE CARBON BY EXTRACTION WITH ORGANIC SOLVENT

BACKGROUND OF THE INVENTION

1. Field of the Invention

The present invention relates to a wet recycling process for used impregnated active carbon by way of extraction with an organic solvent and, more particularly, to such a process to recycle TEDA (triethylenediamine) or KI (Potassium Iodide) impregnated active carbon used to adsorb radioactive organic iodide in nuclear power plants, instead of disposing of it as a radioactive solid waste material, by extracting impregnated substance and adsorbed radioactive iodide from the used impregnated active carbon with an organic solvent to regenerate active carbon, and preparing impregnated active carbon from the regenerated active carbon with TEDA or KI for use in off-gas treatment systems, thus decreasing radioactive solid waste materials and at the same time recycling raw materials.

2. Discussion of Related Art

Impregnated active carbon is a kind of active carbon used as adsorbents to enhance the adsorption efficiency for a specific toxin substance, usually hard to remove with general active carbon, or to extend the period of time of use of an adsorption column. Impregnated active carbon with its chemical activity enhanced to achieve such a use purpose is prepared from an active carbon by impregnation with special chemical compounds and adsorbed to a surface of pore wall.

As for physical adsorption, active carbon exhibits high adsorption capacity for organic iodides but the organic iodides tend to desorb in the atmosphere of high temperature and high humidity. To overcome the problem, the off-gas treatment systems in nuclear power plants use TEDA or KI impregnated active carbon.

However, impregnated active carbon is subject to deterioration so that its removal efficiency for an organic iodide is reduced as time passes. This phenomenon, termed "static ageing", is caused by oxidation or movement of sulfur, and deteriorates the activity of the impregnated active carbon. The impregnated active carbon used in normal treatment is also involved in a phenomenon called "weathering" that is it readily loses its adsorption efficiency in exposure to the external atmospheric oxygen, moisture, and organic or inorganic contaminants. When after a defined period of time, the used impregnated active carbon is revealed to be deteriorated through a performance test, it must be immediately replaced by a new one.

Impregnated active carbon will be verified for quality through the ASTM (American Standard Test Method) including a physical performance test method and a radioactive methyl iodide penetration test for impregnated active carbon, based on the ANSI N509 regulations. In association with impregnated active carbon preparation and performance test as well as the above tests and apparatus, the Korea Atomic Energy Research Institute holds the patent on a preparation method of TEDA/KI impregnated active carbon to remove radioactive iodine (KP No. 072819, Apr. 13, 1994), and it is now pending on: KP Application No. 23971 (Sept 23, 1994) for the apparatus and its operation to dry fluid phase for impregnated active carbon preparation with impregnated and dry processes facilitated; KP Application No. 23972 (Sep. 23, 1994) for the method and apparatus for impregnated active carbon performance test; KP No. 23973 (Sep. 23, 1994) for the method and apparatus for preparing radioactive methyl iodide gas for impregnated active carbon performance test; KP Application No. 14640 (Jun. 2, 1995) for the method and apparatus of extracting TEDA/KI from used impregnated active carbon; KP Application No. 14641 (Jun. 2, 1995), JP No. 2702904 (Oct. 3, 1997) and U.S. patent application Ser. No. 08/572,710 (Dec. 14, 1995) now U.S. Pat. No. 5,719093 for the method an apparatus of removing TEDA and methyl iodide from used TEDA impregnated carbon by using the fluid phase; KP Application No. 14642 (Jun. 2, 1995), JP Application No. 327609, Dec. 15, 1995), and U.S. patent application Ser. No. 08/572,700 (Dec. 14, 1995) now U.S. Pat. No. 5,792,720 for the method and apparatus of TEDA impregnated active carbon in a fluid phase adsorption column by producing TEDA vapor with hot air.

The quality of TEDA impregnated active carbon to use in the nuclear power and other common industries can be determined by a test for physical properties based on the ASTM test and an adsorption performance test using a radioactive organic iodide isotope. When the impregnated active carbon used to remove radioactive organic iodide in the off-gas treatment system of a nuclear power plant is determined from the performance test to have deteriorated adsorption efficiency, it has to be replaced by a new one. The used TEDAIKl impregnated active carbon that absorbs radioactive organic iodide is usually classified as a radioactive solid waste material and stored in a special waste storing place. As the quantity of used impregnated active carbon is increased with increasing time of nuclear power plant operation, it is required to recycle the used impregnated active carbon instead of conventional incineration or solidification disposal treatment.

SUMMARY OF THE INVENTION

Accordingly, the present invention is directed to a wet recycling process for used impregnated active carbon by extraction with an organic solvent that substantially obviates one or more of the problems due to limitations and disadvantages of the related art.

An object of the present invention is to recycle impregnated active carbon used in nuclear power plants instead of disposing of it as a radioactive solid waste material.

Additional features and advantages of the invention will be set forth in the description which follows, and in part will be apparent from the description, or may be learned by practice of the invention. The objectives and other advantages of the invention will be realized and attained as particularly pointed out in the written description and claims hereof as well as the appended drawing.

To achieve these and other advantages and in accordance with the Qua, purpose of the present invention, as embodied and broadly described, by using a method of and apparatus for TEDA/KI extraction (Korean Patent Application No. 14640, Jun. 2, 1995), the used impregnated active carbon is immersed into an acetonitrile ($CH_3CN$) solution in an extraction column to remove impregnated substance from the used impregnated active carbon through an extraction for a defined period of time and reproduce active carbon, and the extractive solution is distilled to separate acetonitrile, impregnated substance and radioactive iodide. Distillation is a separation technique based on the difference between the boiling points of substance in a solution. The boiling point of methyl iodide is 42.4° C. lower than that of acetonitrile, 81.6° C. Considering that TEDA and organic iodide bound to the impregnated active carbon are present in the form of a compound of the formula (1), they are expected to be boiled at a temperature equivalent to or higher than the boiling point of TEDA. When heating, acetonitrile is first vaporized and collected through a condenser.

(1)
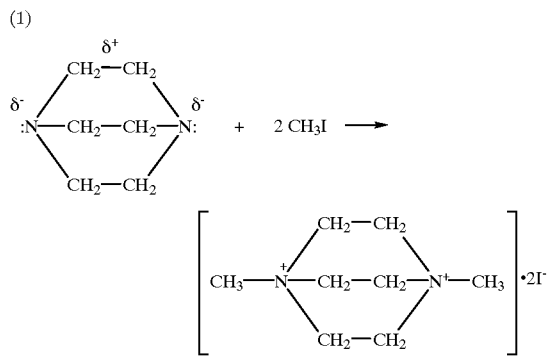

For KI impregnated active carbon, KI having a very high boiling point of 1330° C. undergoes an ion exchange reaction expressed by the reaction formula (2) so that radioactive organic iodide is changed into KI and the stable iodide is removed in the form of organic iodide from the impregnated active carbon.

(2)

$K^{127}I$ (on the charcoal)+$R^{131}I$(in the gas phase)→$K^{131}I$(on the charcoal)+$R^{127}I$(in the gas phase)

The extractive solvent of KI impregnated active carbon is then distilled to remove acetonitrile and deposit white crystals of KI, thus producing a small amount of solid waste material. The volume of waste material can be greatly minimized since the used impregnated active carbon as a radioactive solid waste material is produced in the infinitesimal solid form. In addition, the collected acetonitrile is reused as an extractive solution for extracting the used impregnated active carbon and the extractive solution is distilled to produce concentrated impregnated substance and radioactive iodide, which are then solidified for the disposal purpose.

As far as the return of reproduced active carbon to impregnated active carbon for the reuse purpose in removing radioactive organic iodide, reference may be made, for example to: Patent No. 02819 (Apr. 13, 1994) for the preparation of TEDA/KI impregnated active carbon used to remove radioactive iodide; KP Application No. 23971 (Sep. 23, 1994) for the apparatus and its operation to dry fluid phase for impregnated active carbon preparation with impregnation and dry processes facilitated; and KP Application No. 14642 (Jun. 2, 1995), JP Application No. 3276 ,5ec 15, 1995), and U.S. patent application Ser. No. 08/572, 700 (Dec. 14, 1995) for thetmethod and apparatus of TEDA impregnated active carbon in a fluid phase adsorption column by producing TEDA vapor with hot air.

It is to be understood that both the foregoing general description and the following detailed description are exemplary and explanatory and are intended to provide further explanation of the invention as claimed.

In another aspect, the present invention provides a wet recycling method for the used impregnated active carbon and its procedures by which the solid waste material can be greatly reduced in volume compared with direct disposal methods, with an advantage of recycling materials in the economical view relative to conventional incineration.

BRIEF DESCRIPTION OF THE ATTACHED DRAWINGS

The accompanying drawings, which is included to provide a further understanding of the invention and is incorporated in and constitutes a part of this specification, illustrates embodiments of the invention and together with the description serves to explain the principles of the invention:

In the drawing:

FIG. 1 is a flow diagram illustrating a wet recycling process for used impregnated active carbon by extraction with an organic solvent in accordance with the present invention.

DETAILED DESCRIPTION OF PREFERRED EMBODIMENT

Figure 1:
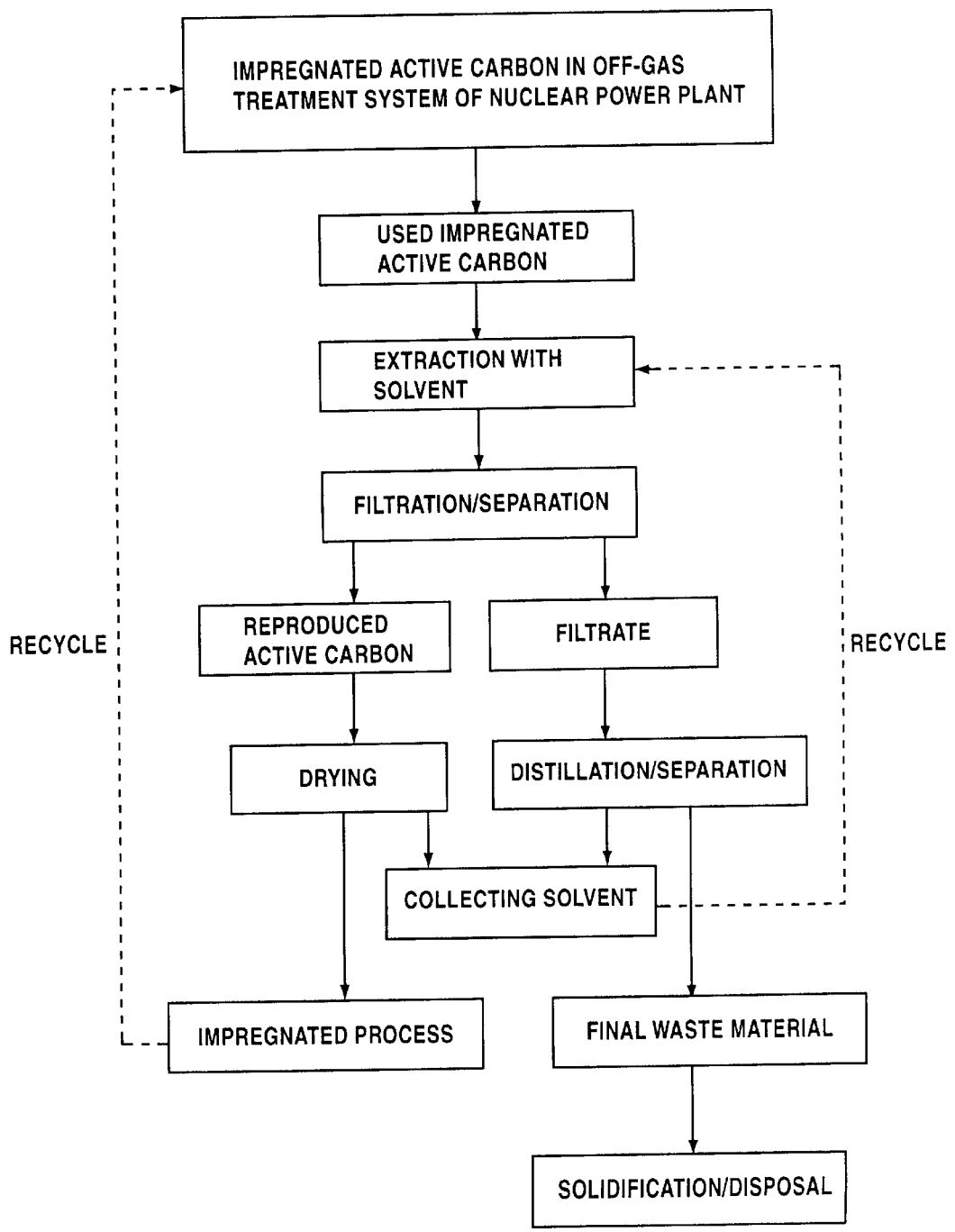

Reference will now be made in detail to the preferred embodiments of the present invention, examples of which are illustrated in the accompanying drawings.

The present invention provides a wet recycle of impregnated active carbon used to remove radioactive organic iodide in nuclear power plants. Impregnated substances and radioactive organic iodide are extracted from the used impregnated active carbon, and the residual active carbon is returned to impregnated active carbon. The extractive solution is then distilled to separate out acetonitrile, impregnated and radioactive substances, which stage decreases the volume of the produced solid waste materials greatly and recycles the materials.

To extract impregnated substances and radioactive iodide from the used impregnated active carbon, the extractive solution of acetonitrile is added to the impregnated active carbon and the mixture is agitated for a defined period of time. The remaining extract and active carbon are filtered and dried to reproduce the active carbon. The active carbon reproduced is then used to prepare TEDA/KI impregnated active carbon according to a preparation method of the present inventor. The filtered extractive solution is heated in a distillation apparatus through a condenser to obtain pure acetonitrile having a low boiling point, and the pure acetonitrile is reused as an extractive solution. A small amount impregnated substance and the radioactive organic iodide are also extracted in concentrated solid form.

The preferred embodiment of the present invention would be described in conjunction with the results of an adsorption performance test.

PREFERRED EMBODIMENT

FIG. 1 is a flow diagram illustrating a wet recycling process for used impregnated active carbon by extraction with an organic solvent in accordance with the present invention.

As shown in FIG. 1, a sample 30 g of TEDA impregnated active carbon used in the off-gas treatment system of a nuclear power plant is placed in an extraction apparatus containing 100 ml of acetonitrile solution. The mixture is agitated at a normal temperature for about 3 hours, carrying out an extraction to remove the mixture of radioactive organic iodide and TEDA. The extractive solution that includes reproduced active carbon and acetonitrile is filtered to separate out the reproduced active carbon from the acetonitrile solution. This active carbon still contains acetonitrile of 0.7 ml per 1 g. When a 100 g sample of KI impregnated active carbon used in the off-gas treatment system of WoolJin nuclear power plant was extracted with 200 ml of acetonitrile solution, the active carbon containing acetonitrile of 0.6 ml per 1 g was regenerated. The active carbon is heated in a drying apparatus in order to remove acetonitrile. Acetonitrile separated out as a gas phase is then condensed to collect pure acetonitrile. Dry active carbon is combined with TEDA to give TEDA impregnated active carbon according to a method of the present inventor.

A radioactive organic iodide adsorption experiment for the reproduced TEDA impregnated active carbon based on the ASTM D 3803-89 showed that the adsorption efficiency for radioactive organic iodide was 99.6% higher than the standard value 97%. As a physical property, the hardness of impregnated active carbon measured by the ASTM D 3802 was 98.7%, which exceeds the standard value 95%. As a result, TEDA impregnated active carbon reproduced from the used impregnated active carbon was turned out to satisfy the standards to reuse in the off-gas treatment system of nuclear power plants. A calorimetric analysis for the amount of TEDA extracted from the used TEDA impregnated active carbon in the extractive solution indicated that TEDA of more than 95% came off the used TEDA impregnated active carbon, and KI of above 95% was extracted. Acetonitrile solution used in the preceding extraction is distilled at a temperature of 80° C. to collect pure acetonitrile through a condenser. Thus, 70% of used acetonitrile solution can be collected for the reuse purpose.

To recycle impregnated active carbon used to remove radioactive iodide according to the present invention as described above, active carbon is reproduced through a wet recycling process using extraction with an acetonitrile solution and utilized to prepare impregnated active carbon that will be used in the off-gas treatment system of a nuclear power plant. The used impregnated active carbon can be reused instead of being disposed by either incineration or solidification, which results in several advantages of decreasing the amount of waste impregnated active carbon, reducing the cost for waste material disposal, securing sufficient space for the waste disposal, and enhancing the economical effect of recycling the impregnated active carbon compared with incineration or solidification disposal. That will do much for reducing the volume of radioactive waste materials to solve the current problem of securing disposal places in many nuclear power developed countries.

When recycling the impregnated active carbon used to remove toxic gases in general industrial facilities according to the present invention, the cost for raw materials of the impregnated active carbon may be curtailed with the enhancement in efficiency to capture toxic gases, resulting in the protection of environments and the contribution to the development of related industries due to cost reduction by recycling useful components from toxic gases.

Furthermore, through a fractional distillation of the used extractive solution, that is, acetonitrile, iodide and TEDA, acetonitrile can be collected and reused as an extractive solution, with wasted extract reduction.

It will be apparent to those skilled in the art that various modifications and variations can be made in the wet recycling process for used impregnated active carbon by extraction with an organic solvent according to the present invention without departing from the spirit or scope of the invention. Thus, it is intended that the present invention cover the modifications and variations of this invention provided they come within the scope of the appended claims and their equivalents.

What is claimed is:

1. A method for purifying TEDA-impregnated active carbon contaminated with radioactive organic iodide comprising:

(a) contacting the TEDA-impregnated active carbon contaminated with organic iodide with acetonitrile to extract acetonitrile-soluble components from carbon;

(b) separating carbon treated in step (a) from an acetonitrile filtrate which includes TEDA and organic iodide; and (c) conducting a distillation of the acetonitrile filtrate to separate purified acetonitrile from waste material containing TEDA and organic iodide.

2. The method according to claim 1, wherein the treated active carbon obtained in step (b) is dried and reimpregnated with TEDA.

3. The method according to claim 1, wherein the acetonitrile separated by distillation is recycled to use in extraction of TEDA-impregnated active carbon contaminated with organic halide in step (a).

4. The method according to claim 1, wherein the treated active carbon obtained in step (b) is dried and acetonitrile removed in such drying process is condensed and combined with acetonitrile obtained in the distillation process of step (c).

5. A method for purifying KI-impregnated active carbon contaminated with radioactive organic iodide comprising:

(a) contacting the KI-impregnated active carbon contaminated with organic iodide with acetonitrile to extract acetonitrile-soluble components from carbon;

(b) separating carbon treated in step (a) from an acetonitrile filtrate which includes KI and organic iodide; and (c) conducting a distillation of the acetonitrile filtrate to separate purified acetonitrile from waste material containing KI and organic iodide.

6. The method according to claim 5, wherein the treated active carbon obtained in step (b) is dried and reimpregnated with KI.

7. The method according to claim 5, wherein the acetonitrile separated by distillation is recycled to use in extraction of KI-impregnated active carbon contaminated with organic halide in step (a).

8. The method according to claim 5, wherein the treated active carbon obtained in step (b) is dried and acetonitrile removed in such drying process is condensed and combined with acetonitrile obtained in the distillation process of step (c).

9. The method according to claim 1, wherein the TEDA-active carbon also contains KI.

10. The method according to claim 5, wherein the Ki-impregnated active carbon also contains TEDA.

11. A method for purifying TEDA-impregnated active carbon contaminated with radioactive organic iodide comprising:

(a) contacting the TEDA-impregnated active carbon contaminated with organic iodide with acetonitrile to extract acetonitrile-soluble components from carbon;

(b) separating carbon treated in step (a) from an acetonitrile filtrate which includes TEDA and organic iodide and drying the separated carbon and thereafter reimpregnating the dried carbon with TEDA; and (c) conducting a distillation of the acetonitrile filtrate to separate purified acetonitrile from waste material containing TEDA and organic iodide;

(d) recycling the acetonitrile separated by distillation to use in extraction of TEDA-impregnated active carbon contaminated with organic halide in step (a); and (e) condensing the acetonitrile removed in the drying process of step (b) and combining the condensed acetonitrile with acetonitrile obtained in the distillation process.

12. A method for purifying KI-impregnated active carbon contaminated with radioactive organic iodide comprising:

(a) contacting the KI-impregnated active carbon contaminated with organic iodide with acetonitrile to extract acetonitrile-soluble components from carbon;

(b) separating carbon treated in step (a) from an acetonitrile filtrate which includes KI and organic iodide and drying the separated carbon and thereafter reimpregnating the dried carbon with KI; and (c) conducting a distillation of the acetonitrile filtrate to separate purified acetonitrile from waste material containing KI and organic iodide;

(d) recycling the acetonitrile separated by distillation to use in extraction of KI-impregnated active carbon contaminated with organic halide in step (a); and (e) condensing the acetonitrile removed in the drying process of step (b) and combining the condensed acetonitrile with acetonitrile obtained in the distillation process.

* * * * *